(12) United States Patent
Vose

(10) Patent No.: US 10,580,543 B2
(45) Date of Patent: Mar. 3, 2020

(54) NEUTRON SEALED SOURCE

(71) Applicant: Illinois Tool Works Inc., Glenview, IL (US)

(72) Inventor: Mark Vose, Windham, NH (US)

(73) Assignee: QSA GLOBAL, INC., Burlington, MA (US)

( * ) Notice: Subject to any disclaimer, the term of this patent is extended or adjusted under 35 U.S.C. 154(b) by 0 days.

(21) Appl. No.: 15/967,720

(22) Filed: May 1, 2018

(65) Prior Publication Data

US 2019/0341163 A1 Nov. 7, 2019

(51) Int. Cl.
*G21G 4/02* (2006.01)
*G21G 4/06* (2006.01)
*G21F 5/10* (2006.01)

(52) U.S. Cl.
CPC .............. *G21G 4/02* (2013.01); *G21F 5/10* (2013.01); *G21G 4/06* (2013.01)

(58) Field of Classification Search
CPC ... G21H 4/02; G21H 4/06; G21H 4/08; A61N 5/1027; G21G 4/02; G21G 4/06; G21G 4/08
See application file for complete search history.

(56) References Cited

U.S. PATENT DOCUMENTS

| | | | | |
|---|---|---|---|---|
| 3,073,768 A * | 1/1963 | Richmond | ............... | G21G 4/02 420/2 |
| 3,145,181 A * | 8/1964 | Courtois | ............. | C03C 10/0036 252/644 |
| 3,351,049 A * | 11/1967 | Lawrence | ............ | A61K 51/1282 600/8 |
| 3,751,668 A * | 8/1973 | Coleman | ................ | G01V 5/10 376/191 |
| 4,853,550 A * | 8/1989 | Schulz | ..................... | G21G 4/02 250/493.1 |
| 6,352,500 B1 * | 3/2002 | Halpern | ............... | A61N 5/1027 600/3 |
| 6,770,021 B2 * | 8/2004 | Halpern | ............... | A61N 5/1027 600/3 |
| 2002/0058851 A1 * | 5/2002 | Halpern | ............... | A61N 5/1027 600/3 |
| 2006/0195003 A1 | 8/2006 | Gross et al. | | |
| 2009/0065712 A1 * | 3/2009 | Zillmer | .................... | G21F 5/02 250/496.1 |

(Continued)

FOREIGN PATENT DOCUMENTS

JP  S5764800  4/1982

OTHER PUBLICATIONS

Y A Karelin et al., "Californium-252 Neutron Sources", Applied Radiation and Isotopes, Elsevier, Oxford GB, vol. 48, No. 10-12, Oct. 12, 1997, pp. 1563-1566.

(Continued)

*Primary Examiner* — Wyatt A Stoffa
(74) *Attorney, Agent, or Firm* — McCarter & English, LLP

(57) ABSTRACT

A neutron sealed source holds cermet wire sources, such as Californium-252/Palladium wires, in separate blind apertures within a stainless steel block. The stainless steel block is part of an inner encapsulation and includes blind apertures arranged in rotational symmetry for receiving the cermet wire sources. The cermet wire sources are separated from each other and the fission and decay heat is rejected through the stainless steel block.

13 Claims, 3 Drawing Sheets

(56) References Cited

U.S. PATENT DOCUMENTS

| | | | | |
|---|---|---|---|---|
| 2012/0195402 A1* | 8/2012 | Chahande | ............. | G21C 7/103 |
| | | | | 376/412 |
| 2013/0251777 A1* | 9/2013 | Kaplan | ............. | A61K 41/0038 |
| | | | | 424/422 |
| 2015/0194229 A1* | 7/2015 | Holden | .................... | G21C 1/30 |
| | | | | 376/190 |
| 2017/0236607 A1* | 8/2017 | Tsang | ....................... | G21G 1/08 |
| | | | | 376/186 |
| 2018/0311511 A1* | 11/2018 | Liu | ..................... | A61N 5/1077 |

OTHER PUBLICATIONS

International Search report issued in PCT/US/2019/023813 dated Oct. 25, 2019.

\* cited by examiner

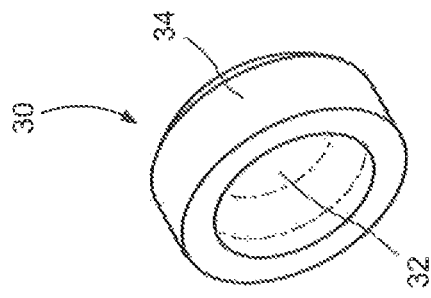
FIG. 11
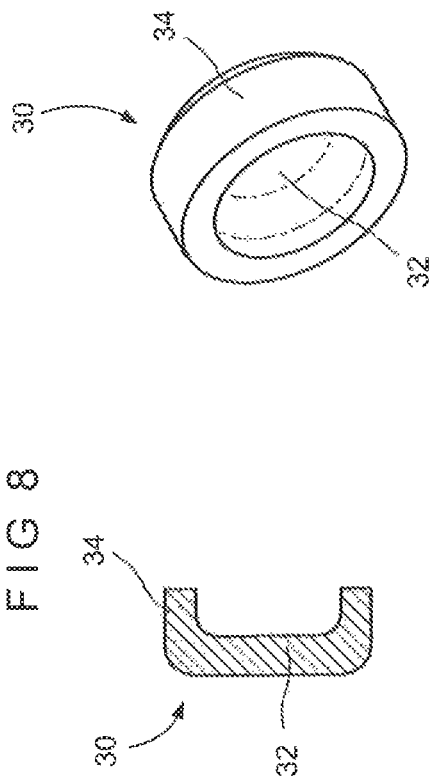
FIG. 8
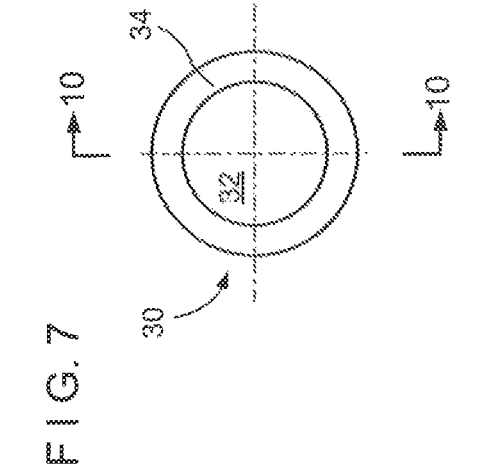
FIG. 10
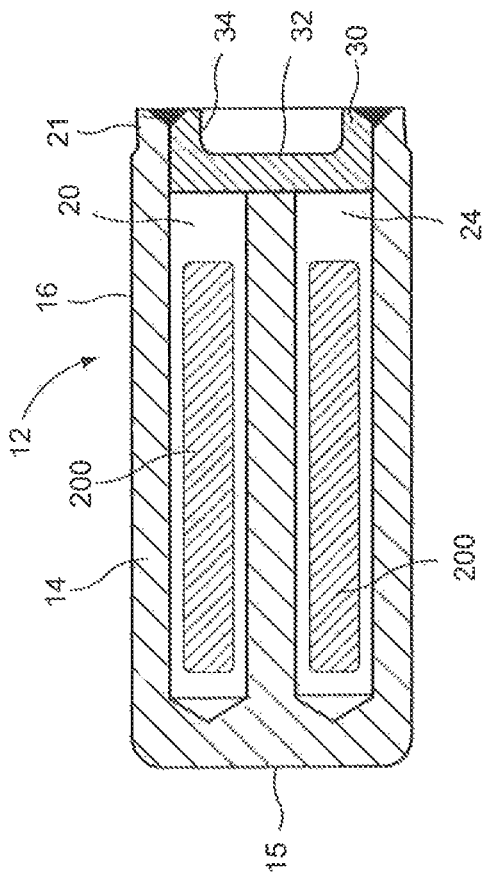
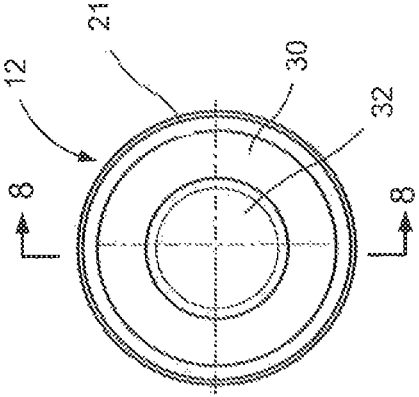
FIG. 7
FIG. 9

NEUTRON SEALED SOURCE

BACKGROUND OF THE DISCLOSURE

Field of the Disclosure

The present disclosure relates to a neutron sealed source which holds cermet wire sources, such as Californium-252/Palladium wires, in separate blind apertures within a stainless steel block, thereby rejecting internally generated fission and decay heat from the cermet wire sources through the stainless steel block.

Description of the Prior Art

In the prior art, it is known to use Californium-252 as a neutron source to provide stable initiation of the nuclear chain reaction during the start up of nuclear reactors. This provides for a more predictable, safe and reliable start up than relying solely on spontaneous fission or delayed fission within the reactor fuel rods. Such a neutron source increases the neutron flux and thereby the fission reaction rate in the reactor thereby allowing the reactor to be initially started even in an otherwise subcritical state. Additionally, such a known neutron source within the reactor during start up allows for the testing of neutron flux detectors. In the prior art, a plurality of cermet wires comprising Californium-252 and Palladium are loosely placed inside a single source cavity and then the source capsule is welded shut, as shown in FIGS. 1 and 2. These source capsules are typically placed throughout the reactor core. However, in such a configuration, the cermet Wires may touch each other. Such a configuration may result in heat from both fission and decay which is high enough to melt the cermet wires during operation within a nuclear reactor thereby risking capsule integrity.

OBJECTS AND SUMMARY OF THE DISCLOSURE

It is therefore an object of the present disclosure to provide a neutron source, using Californium-252 or similar isotopes, which can reject the heat generated in the neutron source during operation in a nuclear reactor, from both fission and decay, and avoid or minimize melting of the source which would risk capsule integrity.

This and other objects are attained by providing a neutron sealed source wherein a stainless steel block, insert, or similar structure is provided with a plurality of compartments or blind apertures, each for receiving a length of Californium-252/Palladium cermet wire or other neutron source. A typical embodiment would include four such compartments or blind apertures, but it is envisioned that more or less compartments or blind apertures may be used for various applications. The stainless steel block, or similar structure, after receiving the plurality of lengths of Californium-252/Palladium cermet wire or other neutron source, is welded or otherwise sealed within a capsule structure.

BRIEF DESCRIPTION OF THE DRAWINGS

Further objects and advantages of the disclosure will become apparent from the following description and from the accompanying drawings, wherein:

FIG. 7 is an end view of the capsule assembly of an embodiment of the sealed neutron source of the present application.

FIG. 8 is a cross-sectional view along plane 8-8 of FIG. 7.

FIG. 9 is a plan view of the lid of an embodiment of the sealed neutron source of the present application.

FIG. 10 is a cross-sectional vies along plane 10-10 of FIG. 9.

FIG. 11 is a perspective view of the lid of an embodiment of the sealed neutron source of the present application.

DETAILED DESCRIPTION OF THE PREFERRED EMBODIMENTS

Figure 2:
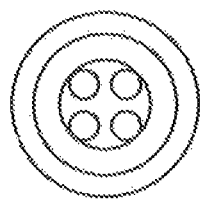
FIG. 2 is an end cut-away view of a typical neutron source of the prior art.
Figure 1:
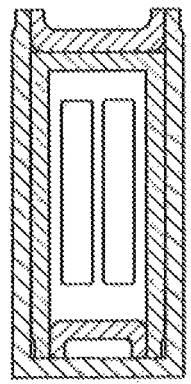
FIG. 1 is a side cut-away view of a typical neutron source of the prior art.

Referring now to the drawings in detail, wherein like numerals indicate like elements through the several views, one sees that an embodiment of the sealed neutron source 10 of the present disclosure is illustrated in FIGS. 3-10. The encapsulation in an exemplary embodiment may be firmed from stainless steel bar, type 304L, condition A (annealed), hot or cold finished, UNS 30403, whereas the active source is typically formed from cermet wires (formed by compacting and sintering a metal and a ceramic) containing Californium-252/Palladium in the chemical form of $Pd/Cf_2O_3$ (Californium (III) oxide). Those skilled in the art will recognize a range of equivalents. In particular, alternative materials for the encapsulation are nickel, titanium and zirconium.

Figure 4:
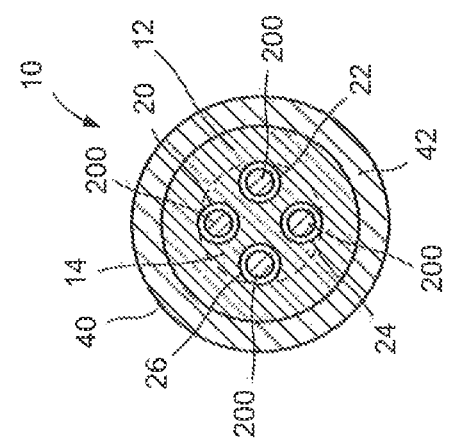
FIG. 4 is an end cut-away view of an embodiment of the sealed neutron source of the present application.
Figure 6:
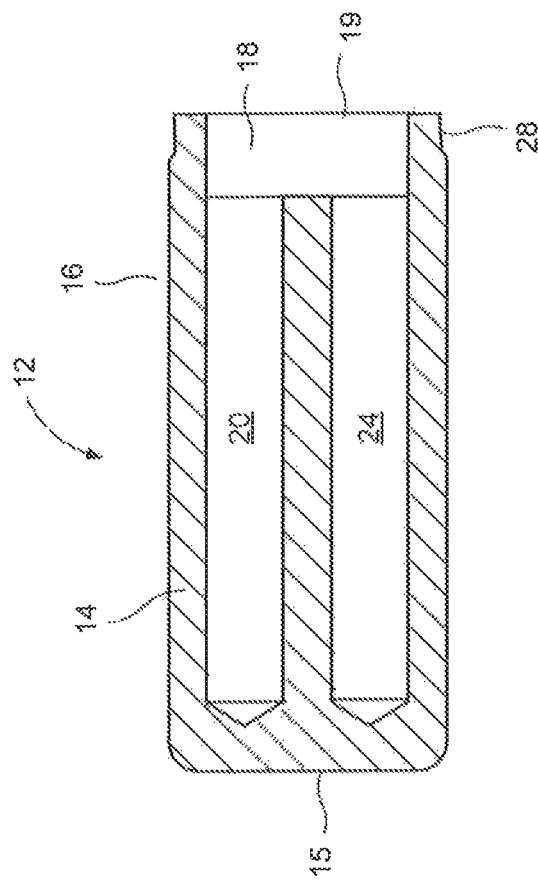
FIG. 6 is a cross-sectional view along plane 6-6 of FIG. 5.
Figure 5:
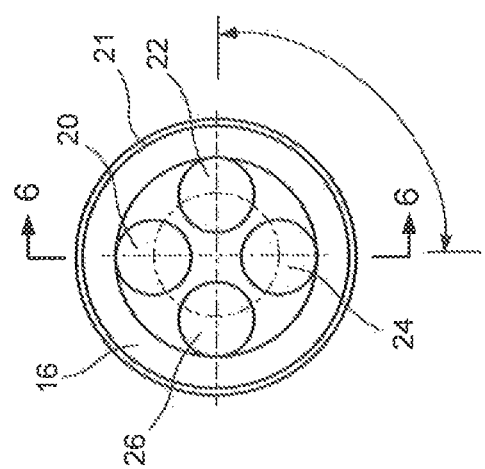
FIG. 5 is an end view of the integrated insert of an embodiment of the sealed neutron source of the present application.

As shown in FIGS. 3-6, the sealed neutron source 10 includes inner integrated cylindrical insert 12 with a relatively solid cylindrical block portion 14 with a closed external end 15. The cylindrical walls 16 of cylindrical block portion 14 extend past cylindrical block portion 14 thereby forming hollow cylindrical lid seat portion 18 adjacent to the cylindrical block portion 14 and further forming open end 19. The exterior portion of cylindrical walls 16 adjacent to open end 19 may include a circumferential chamfered portion 21 of slightly reduced diameter. The inner integrated cylindrical insert 12 thereby forms a first or inner capsule structure. As best shown in FIGS. 5 and 6, four blind apertures 20, 22, 24, 26 are bored or otherwise formed in cylindrical block portion 14 at rotationally symmetric locations (that is, in the case of four blind apertures, spaced ninety degrees apart rotationally, as shown in FIG. 5). The blind apertures 20, 22, 24, 26 are typically parallel with each other, and co-extensive with each other (i.e., longitudinally aligned with each other and of equal depth). The blind apertures 20, 22, 24, 26 form compartments which are separated from each other by the material of the cylindrical block portion 14.

Figure 3:
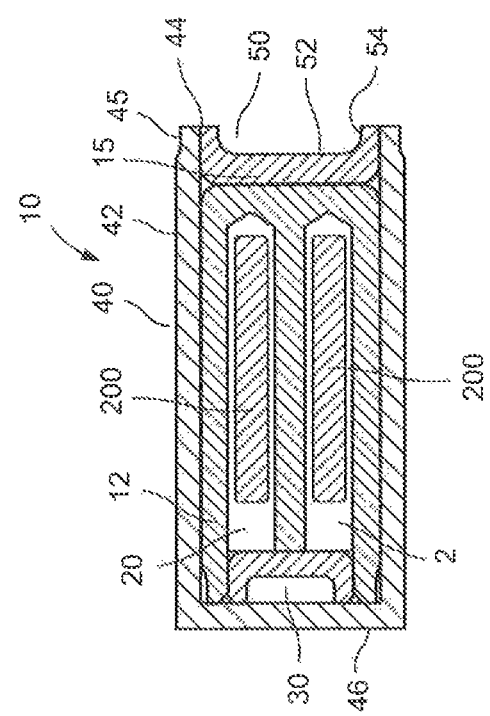
FIG. 3 is a side cut-away view of an embodiment of the sealed neutron source of the present application.

As shown in FIGS. 3 and 4, in the fully assembled configuration, active sources, such as cermet wires 200, typically of Californium-252/Palladium (in the form $Pd/Cf_2O_3$), are placed within the blind apertures 20, 22, 24, 26. The cermet wires 200 are prevented from touching each other by the material of cylindrical block portion 14. Additionally, during operation, the cylindrical block portion 14 serves as a heat sink for fission heat and decay heat from the cermet wires 200. The material of cylindrical block portion 14, as best illustrated in FIG. 4, acts as a separator for the cermet wires 200 within the apertures or compartments 20, 22, 24, 26 as well as a heat sink. Typical dimensions of the cermet wires 200 are a length of 8.85 millimeters and a nominal diameter of 1.22-1.27 millimeters. Cermet wires 200 may have a slightly oval cross section and may have a typical activity loading of 20 milligrams per millimeter. Dimensions for an embodiment of the blind apertures 20, 22, 24, 26 are a total depth of 11.5 millimeters and a nominal diameter of 1.65 millimeters. Dimensions for an embodiment of the inner integrated cylindrical insert 12 are 14.20 millimeters in length and 6.0 millimeters in diameter. However, those skilled in the art will recognize that other dimensions may be preferable for different applications.

As shown in FIGS. 7 and 8, an internal lid 30 includes a transverse circular plate-like portion 32 with longitudinal extending walls 34 extending around the periphery thereof for welding or otherwise sealing against the interior of cylindrical walls 16 when positioned or seated within hollow cylindrical lid seat portion 18 adjacent to the cylindrical block portion 14, after insertion of the cermet wires 200 into apertures 20, 22, 24, 26.

As shown in FIG. 3, the outer cylindrical capsule 40 includes outer cylindrical walls 42 with an open end 44 and a closed end 46. The outer cylindrical capsule 40 forms a second or outer capsule structure, which is concentrically outward from the inner integrated cylindrical insert 12. The exterior portion of cylindrical walls 42 adjacent to open end 44 may include a circumferential chamfered portion 45 of slightly reduced diameter. The inner integrated cylindrical insert 12, including the cermet wires 200 and the internal lid 30, is inserted into the open end 44 of outer cylindrical capsule 40 so that internal lid 30 is urged against the closed end 46 of the outer cylindrical capsule 40. The closed external end 15 of solid cylindrical block portion 14 is positioned inwardly adjacent from the open end 44 of outer cylindrical capsule 40, thereby providing a cylindrical space or seat to receive outer lid 50 which is welded or otherwise sealed in place with respect to the interior of the outer cylindrical walls 42 inwardly adjacent from open end 44 and adjacent to closed external end 15 of inner integrated cylindrical insert 12, Outer lid 50 includes a transverse circular plate-like portion 52 with longitudinal extending walls 54 extending around the periphery thereof for engaging against the interior of outer cylindrical walls 42. Dimensions for an embodiment of the outer cylindrical capsule 40 are 17.20 millimeters in length and 7.825 millimeters in diameter. However, those skilled in the art, will recognize that other dimensions may be preferable for different applications.

In operation, sealed neutron sources 10, typically surrounded by cladding (typically, but not limited to, zirconium, not shown) and configured as a start-up rod, are typically placed in regularly spaced positions among the fuel rods of a nuclear reactor which is being started up. In some applications, a mixture of ninety percent helium and ten percent air may be placed between the cladding (not shown) and the sealed neutron sources 10. The neutrons emanating from the Californium-252 initiate or increase the fission chain reaction within the fuel rods of the nuclear reactor.

Thus the several aforementioned objects and advantages are most effectively attained. Although preferred embodiments of the invention have been disclosed and described in detail herein, it should be understood that this invention is in no sense limited thereby.

What is claimed is:

1. A neutron source, including:
   a first capsule structure, having a cylindrical shape and including a cylindrical block structure defined by first outer walls, the first outer walls extending beyond the block structure and defining a first open end providing access to the block structure, the block structure forming a first closed end; and
   the block structure including a plurality of cylindrical blind apertures for receiving a respective plurality of active sources, wherein the apertures are parallel to each other, separated from each other, and co-extensive;
   a second capsule structure encapsulating the first capsule structure;
   wherein the first outer wall extending beyond the block structure forms a first seat within the first outer wall and adjacent to the block structure;
   wherein the first seat receives a first lid which is welded or otherwise sealed to an interior of the first outer wall in a position immediately adjacent to the block structure and openings of the apertures;
   wherein the second capsule structure includes second outer walls, a second open end and a second closed end, the second outer walls being concentrically outward from the first outer walls; and
   wherein the first open end of first capsule structure abuts an interior of the second closed end of the second capsule structure and the first closed end of the first capsule structure is inwardly adjacent from the second open end of the second capsule structure thereby forming a second seat.

2. The neutron source of claim 1 wherein the second seat receives a second lid which is welded or otherwise sealed to an interior of the second outer wall in a position immediately adjacent to the first closed end of the first capsule structure.

3. The neutron source of claim 1 wherein the first capsule structure is formed from stainless steel.

4. The neutron source of claim 1 wherein the second capsule structure is formed from a material chosen from the group consisting of stainless steel, titanium, nickel and zirconium.

5. The neutron source of claim 1 further including a plurality of active sources emitting neutrons, wherein an active source is placed into each aperture of said plurality of apertures.

6. The neutron source of claim 5 wherein the active sources include Californium-252.

7. The neutron source of claim 6 wherein the active sources further include palladium.

8. The neutron source of claim 5 wherein the active sources include Californium-252 in the form of $Pd/Cf_2O_3$ (palladium/californium (III) oxide).

9. The neutron source of claim 7 wherein the active sources are configured as lengths of cermet wire.

10. A neutron source, including:
    a first capsule structure including a block structure defined by first outer walls, the first outer walls extending beyond the block structure and defining a first open end providing access to the block structure, the block structure forming a first closed end;
    the block structure including a plurality of compartments for receiving a respective plurality of active sources, the compartments separated by heat sink walls;

a second capsule structure, encapsulating the first capsule structure;

wherein the first outer wall extending beyond the block structure forms a first seat within the first outer wall and adjacent to the block structure;

wherein the first seat receives a first lid which is welded or otherwise sealed to an interior of the first outer wall in a position immediately adjacent to the block structure and openings of the compartments;

wherein the second capsule structure includes second outer walls, a second open end and a second closed end, the second outer walls being concentrically outward from the first outer walls; and wherein the first open end of first capsule structure abuts an interior of the second closed end of the second capsule structure and the first closed end of the first capsule structure is inwardly adjacent from the second open end of the second capsule structure thereby forming a second seat.

11. The neutron source of claim 10 wherein the first capsule structure is formed a material chosen from the group consisting of stainless steel, titanium, nickel and zirconium.

12. The neutron source of claim 10 wherein the second seat receives a second lid which is welded or otherwise sealed to an interior of the second outer wall in a position immediately adjacent to the first closed end of the first capsule structure.

13. The neutron source of claim 10 wherein the second capsule structure is formed from a material chosen from the group consisting of stainless steel, titanium, nickel and zirconium.

* * * * *